United States Patent
Swarr

(10) Patent No.: US 8,292,522 B2
(45) Date of Patent: Oct. 23, 2012

(54) SURVEILLANCE CAMERA POSITION CALIBRATION DEVICE

(75) Inventor: Lonnel J Swarr, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 12/900,079

(22) Filed: Oct. 7, 2010

(65) Prior Publication Data

US 2012/0087644 A1 Apr. 12, 2012

(51) Int. Cl.
G03B 17/00 (2006.01)

(52) U.S. Cl. .......................... 396/427; 348/187; 348/190

(58) Field of Classification Search ................... 396/427; 348/190, 187
See application file for complete search history.

(56) References Cited

U.S. PATENT DOCUMENTS

| | | | |
|---|---|---|---|
| 5,118,185 A * | 6/1992 | Courten | 356/139.03 |
| 5,627,616 A | 5/1997 | Sergeant et al. | |
| 6,479,813 B2 * | 11/2002 | Takada et al. | 250/239 |
| 6,715,940 B2 | 4/2004 | Top et al. | |
| 6,975,353 B1 * | 12/2005 | Milinusic et al. | 348/218.1 |
| 7,000,883 B2 * | 2/2006 | Mercadal et al. | 248/660 |
| 7,030,929 B2 * | 4/2006 | Chang et al. | 348/374 |
| 7,110,022 B2 | 9/2006 | Aoyama | |
| 7,224,398 B2 | 5/2007 | Wada | |
| 7,429,999 B2 | 9/2008 | Poulin et al. | |
| 7,675,570 B2 | 3/2010 | Shimada | |
| 7,753,523 B2 | 7/2010 | Kiderman et al. | |
| 7,777,810 B2 | 8/2010 | Kung et al. | |
| 2002/0003965 A1 * | 1/2002 | Landelle et al. | 396/661 |
| 2005/0036036 A1 * | 2/2005 | Stevenson et al. | 348/211.99 |
| 2006/0044406 A1 * | 3/2006 | Swarr et al. | 348/211.1 |
| 2007/0116458 A1 * | 5/2007 | McCormack | 396/427 |
| 2008/0204560 A1 * | 8/2008 | Nilsson | 348/187 |
| 2008/0278578 A1 * | 11/2008 | Kahn | 348/143 |
| 2009/0009752 A1 * | 1/2009 | Duggan et al. | 356/218 |

FOREIGN PATENT DOCUMENTS

| | | |
|---|---|---|
| EP | 1959692 A1 | 8/2008 |
| WO | 2007/059218 A1 | 5/2007 |

* cited by examiner

*Primary Examiner* — W. B. Perkey
*Assistant Examiner* — Linda B Smith
(74) *Attorney, Agent, or Firm* — Taft Stettinius & Hollister LLP; Keith Swedo

(57) ABSTRACT

A method of placing a surveillance camera in a known reference orientation as a result of panning and tilting movements includes coupling the camera to a fixed structure such that the camera may perform the panning movements about a first axis and may perform the tilting movements about a plurality of second axes. Each of the second axes is substantially perpendicular to the first axis. An optical emitter is fixedly attached either to the fixed structure or to the camera. An optical receiver is fixedly attached to the other one of the fixed structure and the camera. The tilting and panning movements are performed with the camera until the emitter and receiver are in a predetermined position relative to each other as determined from a signal that is output by the receiver in response to receiving optical energy from the emitter.

8 Claims, 12 Drawing Sheets

SURVEILLANCE CAMERA POSITION CALIBRATION DEVICE

BACKGROUND OF THE INVENTION

1. Field of the Invention

The present invention relates to security cameras, and, more particularly, to security cameras that undergo pan and tilt movements.

2. Description of the Related Art

Surveillance camera systems are commonly used by retail stores, banks, casinos and other organizations to monitor activities within a given area. The cameras are often provided with the capability to pan and tilt in order to acquire images over a wide domain. The tilt of the camera generally refers to the pivoting of the camera about a horizontal axis that is parallel to the floor, such that the lens of the camera may tilt between an upwardly pointing position and a downwardly pointing position. The pan of the camera refers to the rotation of the camera about a vertical axis that is perpendicular to the floor, such that the lens may scan from side to side. The cameras may also be able to zoom in order to reduce or enlarge the field of view. Oftentimes, each camera is linked to video display units in a security surveillance room with surveillance personnel monitoring the multiple video display units.

In a dome camera system there are typically two axes of motion, including a pan axis and a tilt axis. Dome cameras that use stepper motors are usually an open loop system dependent on the torque of the motor to retain the correct position. However, at power up the camera's central processing unit (CPU) does not know the camera's PT (pan and tilt) position, so the CPU must have some method of finding a start point or a home position. Typically, a home position is a single point in the dome's hemisphere, and this point is found using two sensors, one sensor being for pan and the other sensor being for tilt.

An open-loop motor control system utilizes electronic pulses to move a stepper motor(s) a certain number of rotational steps, and does not have any feedback device to verify the commanded position was reached. In spite of no feedback, this open-loop system works well due to the robust positioning properties of properly designed stepper motors and their associated control electronics.

It is necessary for a pan-tilt-zoom surveillance camera to be able to accurately acquire pre-set viewing angles after loss of and subsequent restoration of power to the unit. Since most motors do not retain their position when de-energized, or include means to accurately freeze the system position upon power removal, a means to provide a consistent restart is needed. It may be easier to provide a means for the system to go through a "homing" or "calibration" routine to establish a consistent starting point from which control electronics can then provide reproducible positions.

U.S. Pat. No. 5,627,616 assigned to Philips Electronics (predecessor to Bosch Security Systems) discloses an open-loop control of pan and tilt motors on a pan-tilt-zoom (PTZ) camera. The patent teaches calibration of the pan home position through use of an optical homing sensor, called a pan motor switch, and actuated by a flag. This flag/sensor approach places design constraints on the camera system. First, a pair of flag/sensors must be provided for both pan and tilt axes. Second, wiring must be provided to the sensor location. Third, clearance must be provided to allow the flag to rotate 360 degrees.

In contrast, some PTZ cameras utilize encoders to determine rotational position for closed-loop control. U.S. Pat. No. 6,715,940, assigned to General Electric, teaches the use of an optical sensor to read a pseudorandom or chain code encoding pattern printed on a bearing race. Such a scheme requires a high degree of precision, which is expensive to achieve.

What is neither disclosed nor suggested by the prior art is a method of establishing a home pan position and a home tilt position of a surveillance camera that overcomes the above-described problems with the prior art.

SUMMARY OF THE INVENTION

The present invention provides a PTZ camera system wherein one of an IR emitter (LED) and IR detector is placed on a fixed stage, and the other is positioned on a moving stage affixed to a camera lens module, which experiences both pan and tilt motion relative to the fixed stage. The detector signal output that results from illumination by the LED light output is used to determine relative alignment of the moving stage relative to the fixed stage in both pan and tilt directions. The two devices are configured to align when the camera lens optical axis is at a horizontal tilt position viewing the horizon, and at a certain pan rotational position. Sufficient emitter irradiance power is provided to reach the detector sensor's surface and produce a sufficient signal level. The surveillance camera position calibration sequence includes a) tilt movement to set initial tilt position relative to a mechanical stop; b) pan movement to achieve initial "rough" alignment of the emitter and the detector; and c) pan and tilt movement to achieve final precise alignment of the emitter and the detector.

The invention comprises, in one form thereof, a method of placing a surveillance camera in a known reference orientation as a result of panning and tilting movements. The camera is coupled to a fixed structure such that the camera may perform the panning movements about a first axis and may perform the tilting movements about a plurality of second axes. Each of the second axes is substantially perpendicular to the first axis. An optical emitter is fixedly attached either to the fixed structure or to the camera. An optical receiver is fixedly attached to the other one of the fixed structure and the camera. The tilting and panning movements are performed with the camera until the emitter and receiver are in a predetermined position relative to each other as determined from a signal that is output by the receiver in response to receiving optical energy from the emitter.

The invention comprises, in another form thereof, a surveillance camera arrangement including a camera coupled to a fixed structure. An actuator means causes the camera to perform panning movements about a vertical axis and perform tilting movements about any of a plurality of horizontal axes. An optical emitter is fixedly attached to either the fixed structure or the camera. An optical receiver is fixedly attached to the other one of the fixed structure and the camera and produces an output signal in response to receiving optical energy from the optical emitter. A processor receives the output signal from the optical receiver. The processor drives the actuator means, dependent upon the output signal from the optical receiver, to cause the camera to perform tilting and panning movements until an amplitude of the output signal from the optical receiver is maximized.

The invention comprises, in yet another form thereof, a method of placing a surveillance camera in a known reference orientation as a result of panning and tilting movements. The camera is coupled to a fixed structure such that the camera may perform the panning movements about a first axis and may perform the tilting movements about a plurality of second axes. Each of the second axes is substantially perpendicular to the first axis. An optical emitter is fixedly attached either to the fixed structure or to the camera. An optical receiver is fixedly attached to the other one of the fixed structure and the camera. A signal is output from the receiver in response to the receiver receiving optical energy from the emitter. The panning movements are performed with the camera until a first local maximum in the output signal from the optical receiver is identified. The camera is moved to a panning position associated with the local maximum. The tilting movements are performed with the camera until a second local maximum in the output signal from the optical receiver is identified. The camera is moved to a tilting position associated with the second local maximum. The steps of performing panning movements, moving the camera to the panning position, performing tilting movements, and moving the camera to the tilting position are iteratively and alternately repeated until the local maximum in the output signal from the optical receiver is approximately equal to a maximum possible value.

The invention comprises, in still another form thereof, a method of placing a surveillance camera in a known reference orientation as a result of panning and tilting movements. The camera is coupled to a first fixed structure such that the camera may perform the panning movements about a first axis and may perform the tilting movements about a plurality of second axes. Each of the second axes is substantially perpendicular to the first axis. An optical image source is fixedly attached to a second fixed structure. The camera is utilized to capture images produced by the optical image source. The tilting and panning movements are performed with the camera until a characteristic of the images of the optical image source captured by the camera is substantially optimized.

An advantage of the present invention is that only one sensor is required to find both the pan home position and the tilt home position.

Another advantage of the invention is that no tilt home signal is required to be transmitted through the slip ring. Thus, using one sensor instead of two sensors reduces system cost by lowering the number of parts and reducing the number of rings in the slip ring.

Yet another advantage is that the invention eliminates the need for two homing/calibration sensors on both the pan and tilt axes, and allows design flexibility for placement of a single sensor.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
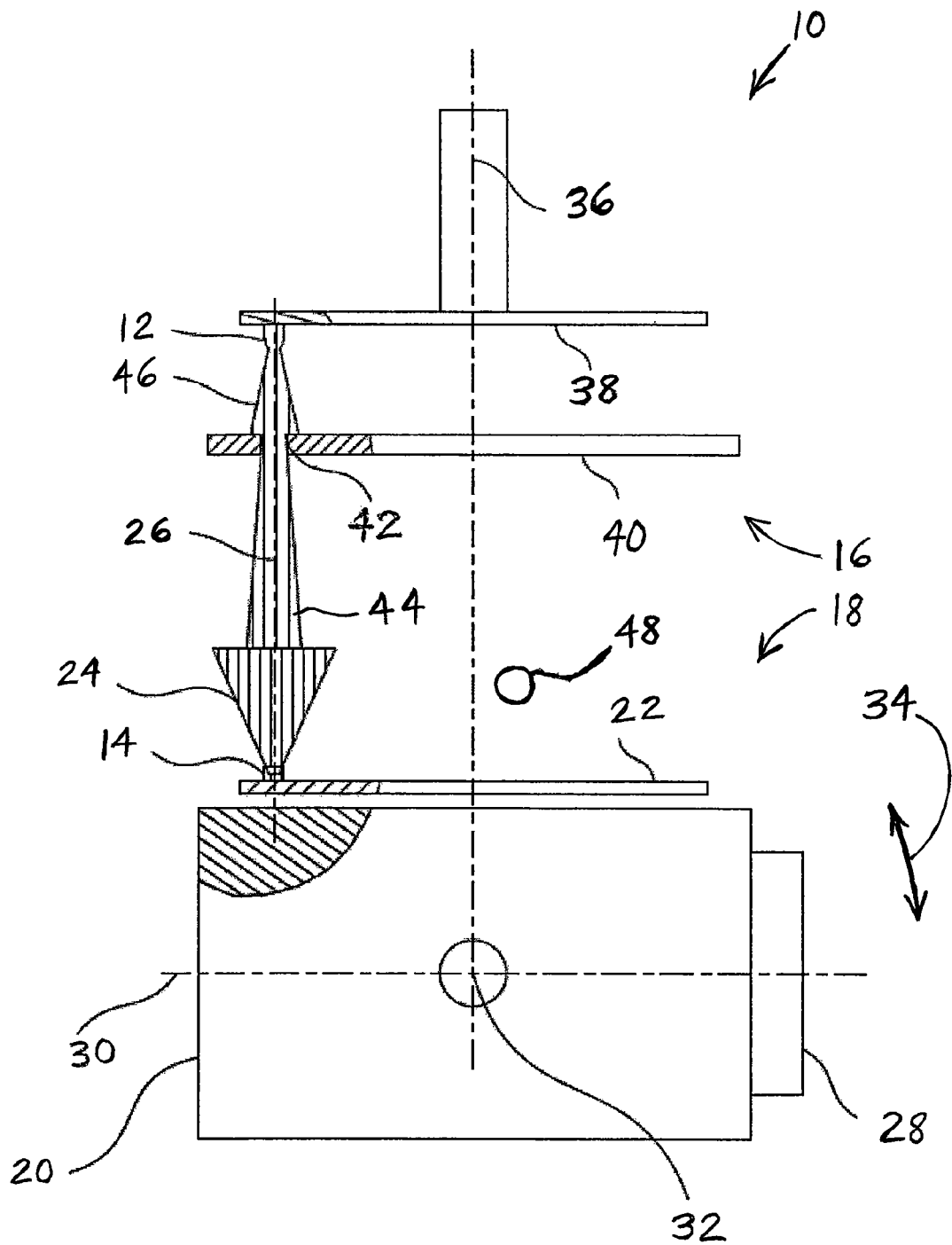
FIG. 1 is a schematic view of one embodiment of a surveillance camera arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of a surveillance camera arrangement 10 of the present invention including an IR (infrared) emitter (LED) 12 and an IR detector sensor (either a photodiode or phototransistor) 14. In the embodiment of FIG. 1, emitter 12 is disposed on a fixed stage 16, and detector 14 is disposed on a moving stage 18 affixed to a camera lens module 20, which experiences both pan and tilt motion relative to fixed stage 16. However, it is also within the scope of the invention for the detector to be disposed on the fixed stage and the emitter to be disposed on the moving stage.

Moving stage 18 includes a moving circuit board 22 on which is disposed detector 14. Detector 14 includes a field of view 24 having an axis 26.

Camera lens module 20 includes an objective lens 28 on its front end. Lens 28 has an optical axis 30.

Camera lens module 20 includes a tilt axis 32 extending into and out of the page of FIG. 1. Moving stage 18 is tiltable about axis 32 relative to fixed stage 16 in directions indicated by arcuate arrow 34. Camera lens module 20 also includes a pan axis 36 about which moving stage 18 may rotate or pan relative to fixed stage 16.

Fixed stage 16 includes a fixed circuit board 38 on which IR LED emitter 12 is disposed. Fixed stage 16 also includes a fixed opaque planar barrier 40 having an aperture 42 that is sized to allow a central portion 44 of an emitter beam 46 to pass therethrough. As shown in FIG. 1, central portion 44 of an emitter beam 46 may be narrower than the field of view of detector 14, and thus detector 14 may be able to receive the entire central portion 44.

This illumination of detector 14 by the light output of emitter 12 results in detector 14 outputting a detector signal that may be used to determine relative alignment of moving stage 18 relative to fixed stage 16 in both the pan direction and the tilt direction. Emitter 12 has sufficient radiance power for the light therefrom to reach the detector sensor's surface and cause detector 14 to produce a sufficient and measureable signal level in response thereto.

Moving stage 18 and fixed stage 16 may align when the camera lens optical axis 30 is at a horizontal tilt position (e.g., viewing the horizon, and/or being oriented at 90 degrees relative to a vertical axis), and is at a certain or predetermined pan rotational position. When moving stage 18 and fixed stage 16 are aligned with each other, then emitter 12 and detector 14 are also aligned with each other, and axis 26 of field of view 24 of detector 14 is also the axis of emitter beam 46. When such alignment of emitter 12 and detector 14 is achieved, then moving stage 18 is in a reference home position and calibration is complete.

When the camera is directed at the horizon, emitter 12 and detector 14 may be roughly facing each other, so the central axes of central portion 44 of emitter beam 46 and field of view 24 of detector 14 may be roughly aligned with each other. The reduction of the width of beam 46 as provided by aperture 42 may facilitate the process of locating the center of the emission beam via the technique of finding the midpoint between opposite edges of the beam, as for example by locating the top and bottom edges of the emitter beam when establishing the tilt home position. If the emitter beam is too wide and overlaps the mechanical stop, then the camera will hit the mechanical stop before finding the upper boundary of the beam.

Figure 2:
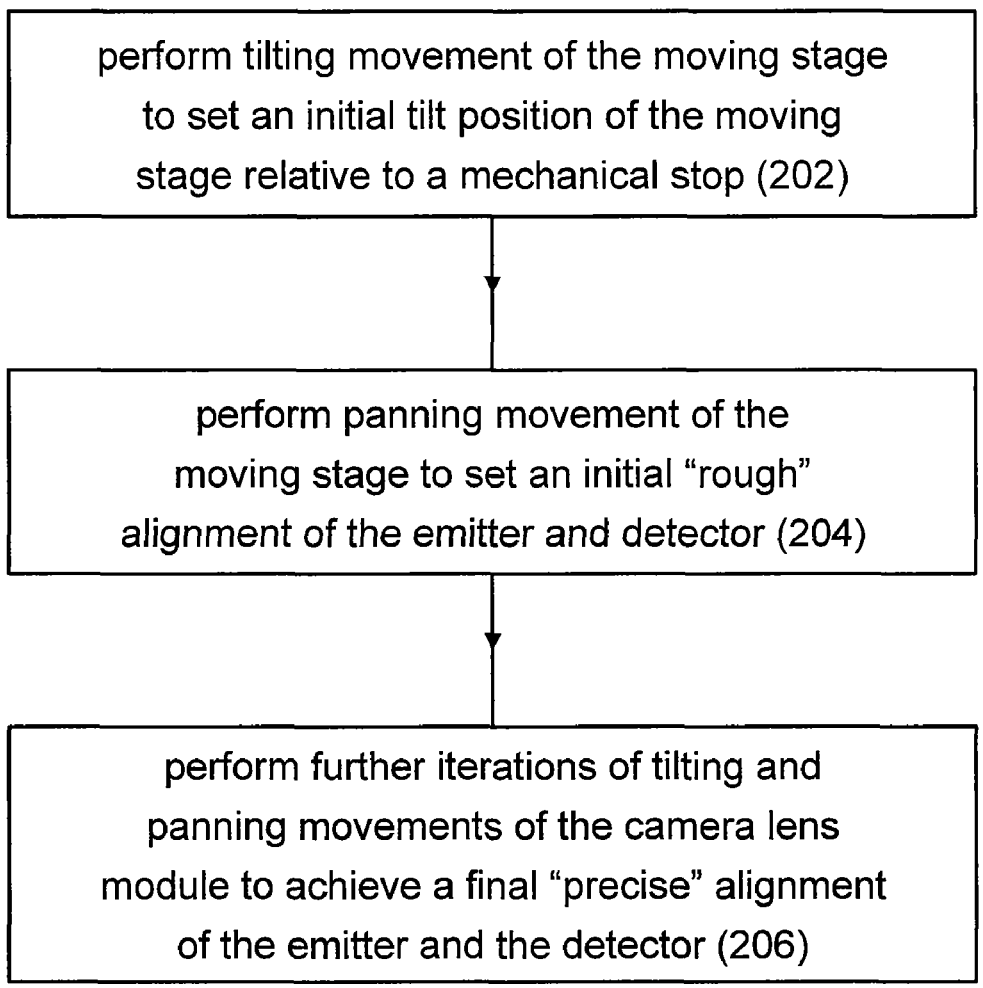
FIG. 2 is flow chart of one embodiment of a surveillance camera position calibration method of the present invention.

One embodiment of a surveillance camera position calibration method 200 of the present invention is described with reference to FIG. 2. In a first step 202, moving stage 18 undergoes tilting movement to set an initial tilt position of moving stage 18 relative to a mechanical stop, such as mechanical stop 48, which is only schematically illustrated in FIG. 1. That is, mechanical stop 48 may obstruct further tilting movement of moving stage 18. Mechanical stop 48 may be an immovable barrier relative to a tilting direction, but may or may not undergo panning movement along with camera lens module 20. In the embodiment of a surveillance camera arrangement 300 shown in FIG. 3, a mechanical stop 348 is in the form of a fragmentarily-depicted annular ring that is disposed above camera lens module 320 and that rotates in panning movements along with camera lens module 320.

Surveillance camera arrangement 300 further includes an IR LED emitter 312 disposed on a fixed circuit board 338 of a fixed stage 316. Emitter 312 outputs an emitter beam 346. Fixed stage 316 may define a pan axis 336 about which camera lens module 320 may rotate. A moving stage 318 includes, in addition to camera lens module 320, an objective lens 328 having an optical axis 330. Moving stage 318 undergoes tilting movement about a tilt axis 332. Moving stage 318 includes a moving circuit board 322 on which is disposed an IR detector 314. Detector 314 includes a field of view 324.

Figure 7:
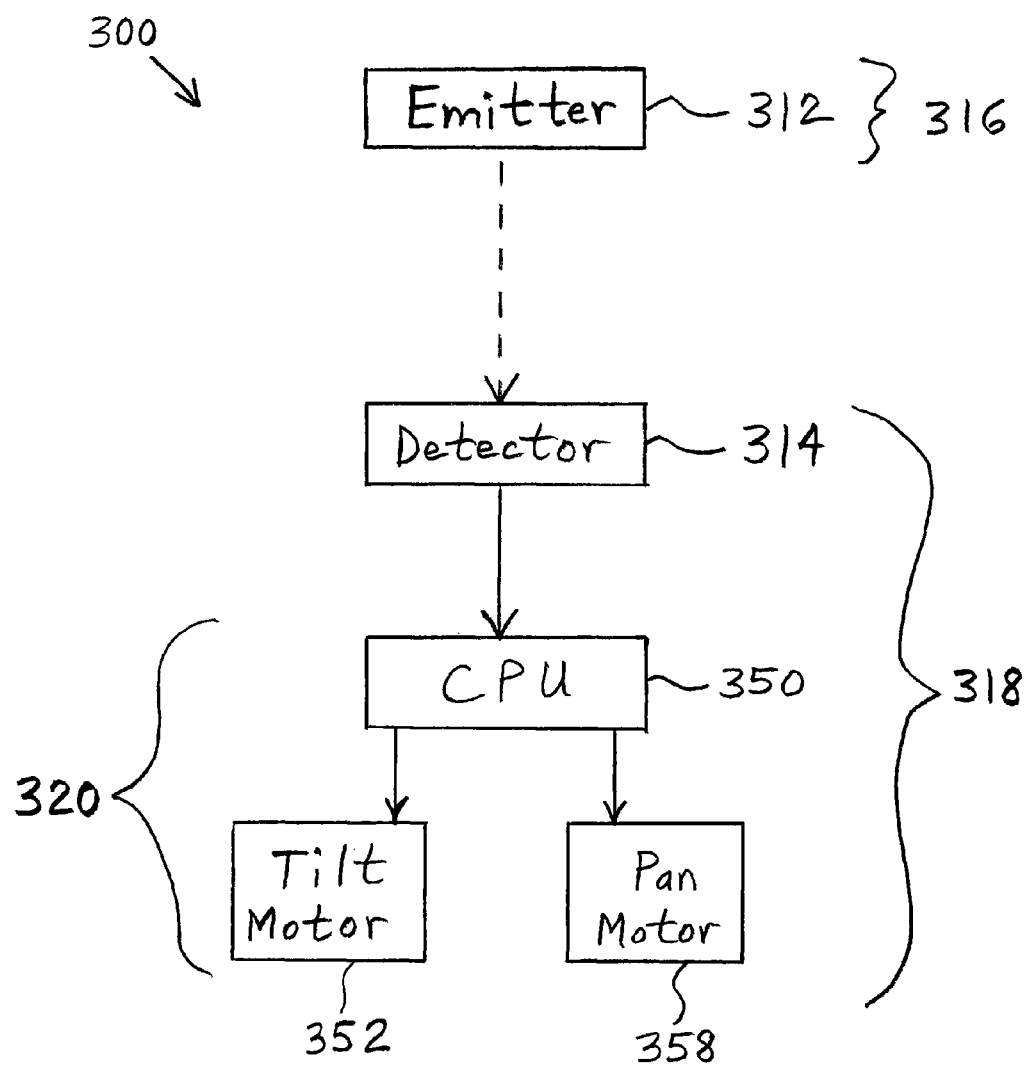
FIG. 7 is a simplified block diagram of the electronics of the surveillance camera arrangement of FIG. 3.

As described above, the moving stage may undergo tilt movement in order to set an initial tilt position relative to a mechanical stop. Initially at power up, a CPU 350 (FIG. 7) of camera lens module 320 does not know the existing pan or tilt positions of the camera lens module. However, the CPU knows the mechanical limits of the tilt range (e.g., in degrees) relative to the horizon (e.g., a horizontal orientation of the camera lens module), and thus may use this knowledge to drive a tilt motor 352 to tilt camera lens module 320 close to the horizontal orientation. That is, the CPU controls the tilt motor's actuation and tilts the camera lens module beyond the maximum operational tilt range to ensure that the camera lens module reaches and engages the upper mechanical stop 348, which is a few degrees beyond the operational tilt range of the camera lens module as defined by software within the CPU.

CPU 350 may know the fixed angle between the orientation of camera lens module 320 when it engages upper mechanical stop 348 and the orientation of camera lens module 320 when optical axis 330 has a horizontal orientation. In one embodiment, this angle may be approximately between 10 degrees and 15 degrees. In another embodiment, this angle may be approximately between 5 degrees and 30 degrees. Once the CPU is sure that it has operated the tilt motor sufficiently to engage the mechanical stop with the camera lens module, the CPU may then operate the tilt motor in the opposite direction in order to tilt the camera lens module back down from the mechanical stop by the known angle (e.g., between 10 degrees and 15 degrees) between the mechanical stop and the horizon. Thus, the camera lens module is tilted back from engagement with the mechanical stop to a horizontal orientation, similar to the orientation shown in FIG. 1.

The precision of the tilt position may not be crucial because an IR LED and detector, such as emitter 312 and detector 314, typically have a wide emission beam angle and a wide detection angle, respectively. For example, in one embodiment, an emission beam angle 354 (FIG. 3) is about 30 degrees, and a detection angle 356 is about 120 degrees. Thus, emission beam 346 may easily overlap the cone of detection 324, even with an imprecise tilt angle, and thus detector 314 may still easily receive optical energy from emitter 312. CPU 350 may or may not control the operation of emitter 312, such as via a slip ring (not shown).

Figure 4:
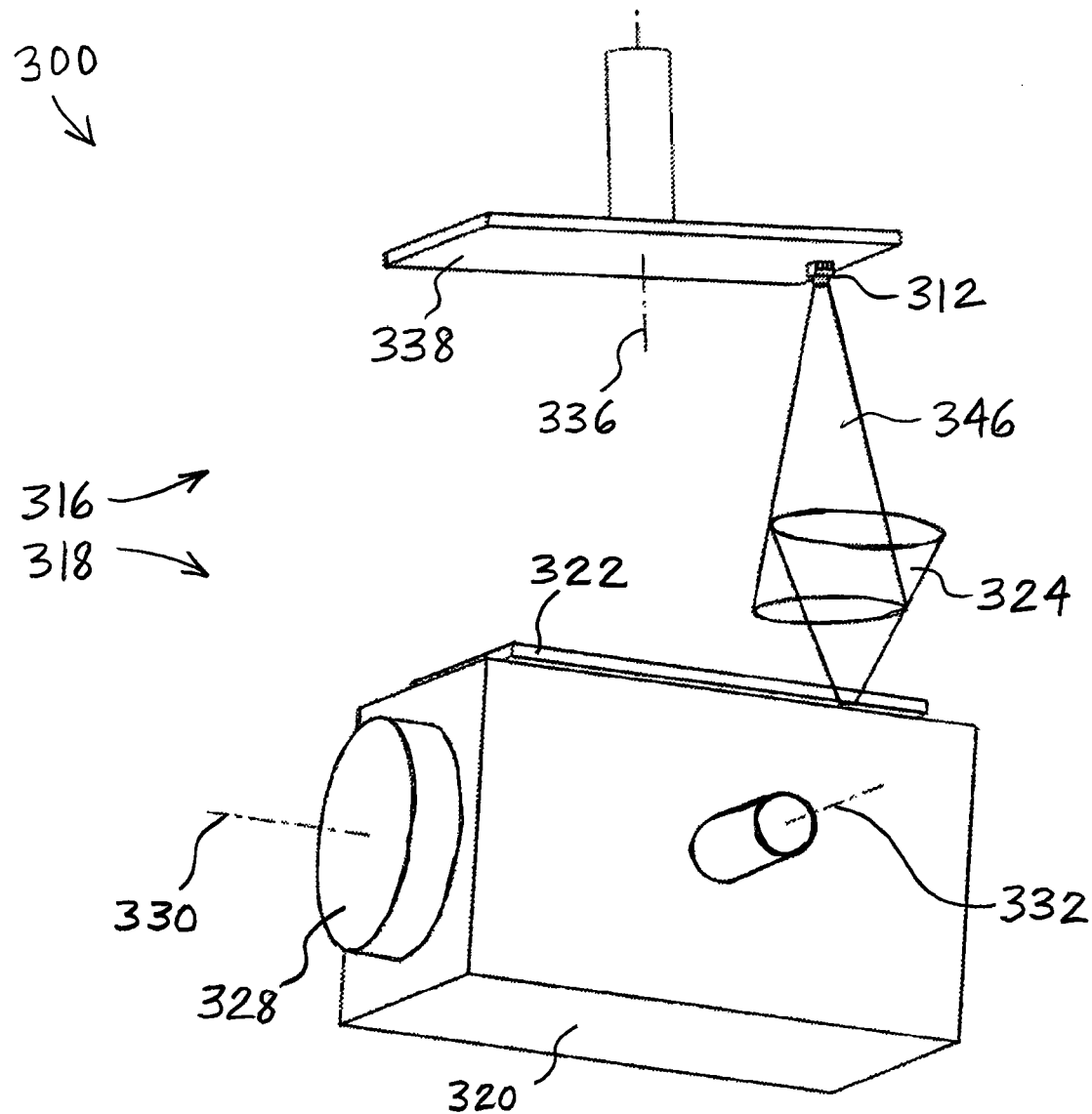
FIG. 4 is a schematic view of the surveillance camera arrangement of FIG. 3 after it has undergone pan movement to achieve an initial rough alignment of the emitter and the detector.

In a second step 204, the camera lens module undergoes panning movement to achieve an initial "rough" alignment of the emitter and the detector. For example, as shown in FIG. 4, camera lens module 320 has undergone panning movement about axis 336 until emitter beam 346 is roughly aligned with field of view 324 of detector 314. In one embodiment, camera lens module 320 completes a full 360 degree rotation of panning movement about axis 336, and tracks the variation of the detector output signal throughout the rotation. Camera lens module 320 then returns to the rotational position at which the detector output signal was at a maximum, and this position is deemed to be where emitter 312 and detector 314 are roughly aligned.

Figure 5:
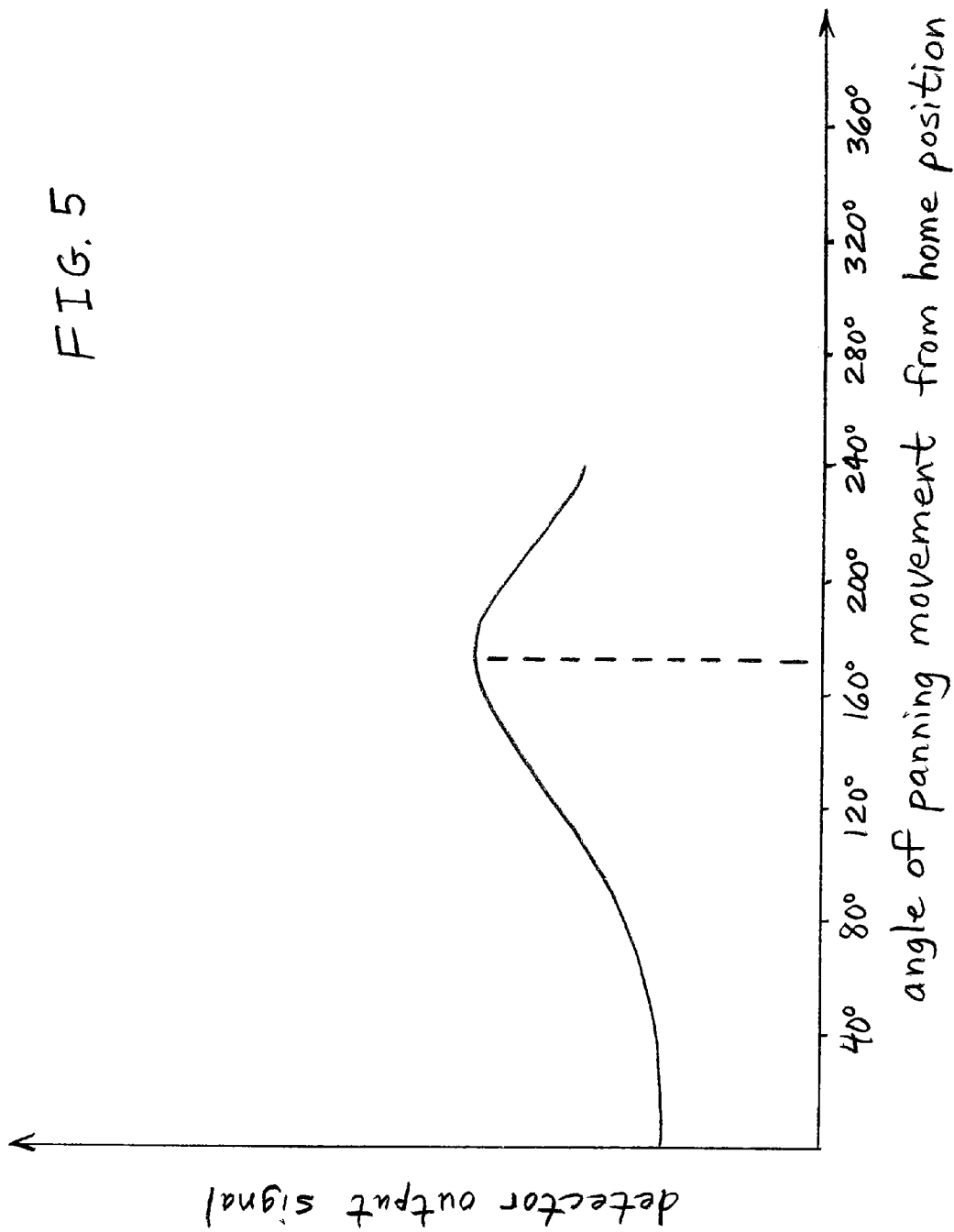
FIG. 5 is an example plot of the detector output signal versus the angle of panning movement from the home position achieved in FIG. 3.

In another embodiment, camera lens module 320 does not necessarily need to complete a full 360 degree rotation of panning movement about axis 336, but rather ends the panning movement after camera lens module 320 finds a local maximum in the detector output signal. For instance, FIG. 5 is an example plot of the detector output signal versus the angle of panning movement from the home position achieved in FIG. 3. After completing about 240 degrees of panning movement from the home position, camera lens module 320 determines from analyzing the detector output signal data that a local maximum in the detector output signal occurred when camera lens module 320 had completed about 173 degrees of panning movement from the home position. Thus, camera lens module 320 returns to the location that is about 173 degrees removed from the home position, and this position is deemed to be where emitter 312 and detector 314 are roughly aligned.

As described above, the CPU may operate pan motor 358 (FIG. 7) to cause camera lens module 320 to undergo pan movement to achieve an initial "rough" alignment of emitter 312 and detector 314. That is, after CPU 350 and tilt motor 352 tilt camera lens module 320 such that the optical axis 330 of the camera is at or near the horizon (similarly to the orientation shown in FIG. 1, but not necessarily with the emitter and the detector being even close to being in alignment with each other), then the CPU may find the camera lens module's approximate or rough home pan position by operating pan motor 358 in one direction until detector sensor 314 detects the emitter beam as shown in FIG. 4.

In one embodiment, the CPU finds the camera lens module's approximate or rough home pan position by operating pan motor 358 in one direction until detector sensor 314 detects that a local maximum in the strength of the emitter beam has been located and panned through, such as illustrated in FIG. 5. Then the CPU operates pan motor 358 in the opposite direction back to the pan location at which the local maximum emitter beam strength was identified.

Although this particular pan position shown in FIG. 4 may result in a local maximum emitter signal strength for the particular and current tilt position of the camera lens module, this pan position may not necessarily be the same "precise" pan position that maximizes the received signal strength when the camera lens module is in the optimal tilt position for receiving the emitter beam. There are various reasons why this rough pan position may not be the same as the precise pan position for optimizing optical energy reception, including the optical energy being reflected off of surrounding components onto the detector when the camera lens module is not in the optimal tilt position, or nonlinearities in emission beam 346 and/or in cone of detection 324, for example. Thus, additional adjustments of both the tilt position and the pan position of the camera lens module may need to be performed in order to arrive at and identify the combination of tilt position and pan position at which reception of the optical energy is maximized, and at which the central axis of emission beam 346 is likely aligned with the central axis of cone of detection 324.

In a final step 206, the camera lens module undergoes further iterations of tilting and panning movements to achieve a final "precise" alignment of the emitter and the detector. For example, camera lens module 320 may have a ninety degree range of tilting motion about tilt axis 332. In one embodiment, camera lens module 320 sweeps through the full 90 degree range of tilting movement about axis 332, and tracks the variation of the detector output signal throughout the tilting movement. Camera lens module 320 then returns to the tilt position at which the detector output signal was at a maximum, and this position is deemed to be where emitter 312 and detector 314 are still roughly aligned, but more precisely aligned than in FIG. 4 after only the panning movement.

In another embodiment, camera lens module 320 does not necessarily need to sweep through the entire 90 degrees of tilting movement range about axis 332, but rather ends the tilting movement after camera lens module 320 finds a local maximum in the detector output signal. For instance, similarly to the panning technique described above with reference to FIG. 5, camera lens module 320 may determine somewhere through the tilting movement that the detector output signal has already passed through a local maximum in the detector output signal. Thus, camera lens module 320 returns to the tilt position at which the local maximum occurred, and this position is deemed to be an improvement in alignment over the rough alignment position of FIG. 4.

As described above, it may be necessary for the camera lens module to undergo several iterations of alternating pan movement and tilt movement in order to achieve a final precise alignment of the emitter and the detector, as indicated by a maximum possible reception of optical energy, given the physical constraints of the arrangement. Once the detector sensor 314 is in the path of the emitter beam, the CPU pans the camera lens module slowly and searches for the center of the emitter beam in the pan direction. This can be done with an A/D (analog to digital) convertor that interconnects detector 314 and CPU 350. The digitized detector output signal may be tracked and recorded as a function of pan position, and an example of such tracked data is illustrated in FIG. 5. Once the initial rough pan home position is found at which the digitized detector output signal is maximized with respect to pan position for the given tilt position (as shown in FIG. 4), the CPU reverses the direction of panning and returns the camera lens module to the rough pan home position.

With the camera lens module now in the rough pan home position, the CPU slowly tilts the camera lens module up and down until the center of the emission beam is roughly found in the tilt direction. This process of finding the rough home tilt position may be analogous to the process of finding the rough home pan position. More specifically, the detector output signal may be digitized throughout the sweep of the tilt positions, and a second local maximum in the strength of the detector output signal may be identified after the corresponding tilt position has been passed through during the course of the tilting movement. This local maximum in the detector output signal may be associated with a corresponding rough tilt home position for the given rough pan home position.

In one embodiment, the process of finding the home position of the camera lens module ends here with the rough pan home position in combination with the rough tilt home position. That is, although this position may not strictly result in achieving the maximum possible level of received optical energy, and may not correspond with a strict alignment of the emitter and the detector, it is a position that may be considered precise if not completely accurate, and it is a position that may be consistently and repeatedly achieved in the future, and thus this position may well serve the function of a home position for the camera lens module.

However, it is alternatively possible for the camera lens module to undergo additional iterations of alternating movement and calibration in the pan and tilt directions in order to achieve a true maximum reception of optical energy, and a true and more precise alignment of the emitter beam and the cone of reception. In one embodiment, after camera lens module has been placed in both the rough home pan position and the rough home tilt position, the CPU causes the camera lens module to again scan through a range of pan positions, although perhaps within a tighter range around the rough home pan position than in the initial panning movement. A third local maximum of the detector output signal is identified in correspondence with a second home pan position that is slightly more precise than the initial rough home pan position. The CPU moves the camera lens module to this second home pan position, and the CPU then causes the camera lens module to undergo a second scan along the tilt positions, but again within a tighter range around the rough home tilt position than in the initial tilting movement. A fourth local maximum of the detector output signal is identified in correspondence with a second home tilt position that is slightly more precise than the initial rough home tilt position. The CPU moves the camera lens module to this second home tilt position.

If the third or fourth local maximum of the detector output signal exceeds the second local maximum by less than a threshold amount, then it may be concluded that the precision of the alignment between the emitter and the detector is sufficient to consider the combination of the second home pan position and the second home tilt position to be the pan tilt home position of the moving stage for future reference. The process of establishing the pan tilt home position of the moving stage is thus concluded.

If, however, the third or fourth local maximum of the detector output signal exceeds the second local maximum by more than a threshold amount, then it may be concluded that the precision of the alignment between the emitter and the detector may not yet be sufficient to consider the combination of the second home pan position and the second home tilt position to be the pan tilt home position of the moving stage for future reference. That is, it is possible that further improvement can be achieved in the alignment between the emitter and the detector. Accordingly, the CPU causes the camera lens module to again scan through a range of pan positions, and a fifth local maximum of the detector output signal is identified in correspondence with a third home pan position that is slightly more precise than the second home pan position (perhaps because the corresponding second home tilt position is more precise than the initial home tilt position). The CPU moves the camera lens module to this third home pan position, and the CPU then causes the camera lens module to undergo a third scan along the tilt positions. A sixth local maximum of the detector output signal is identified in correspondence with a third home tilt position, and the CPU moves the camera lens module to this third home tilt position.

If the fifth or sixth local maximum of the detector output signal exceeds both the third and fourth local maxima by less than a threshold amount, then it may be concluded that the precision of the alignment between the emitter and the detector is now sufficient to consider the combination of the third home pan position and the third home tilt position to be the pan tilt home position of the moving stage for future reference. The process of establishing the pan tilt home position of the moving stage is thus concluded.

If, however, the fifth or sixth local maximum of the detector output signal exceeds both the third and fourth local maxima by more than the threshold amount, then the above iterative process continues until further substantial increases in the detector output signal are no longer being achieved. At this point, the process of establishing the pan tilt home position of the moving stage is concluded.

Figure 6:
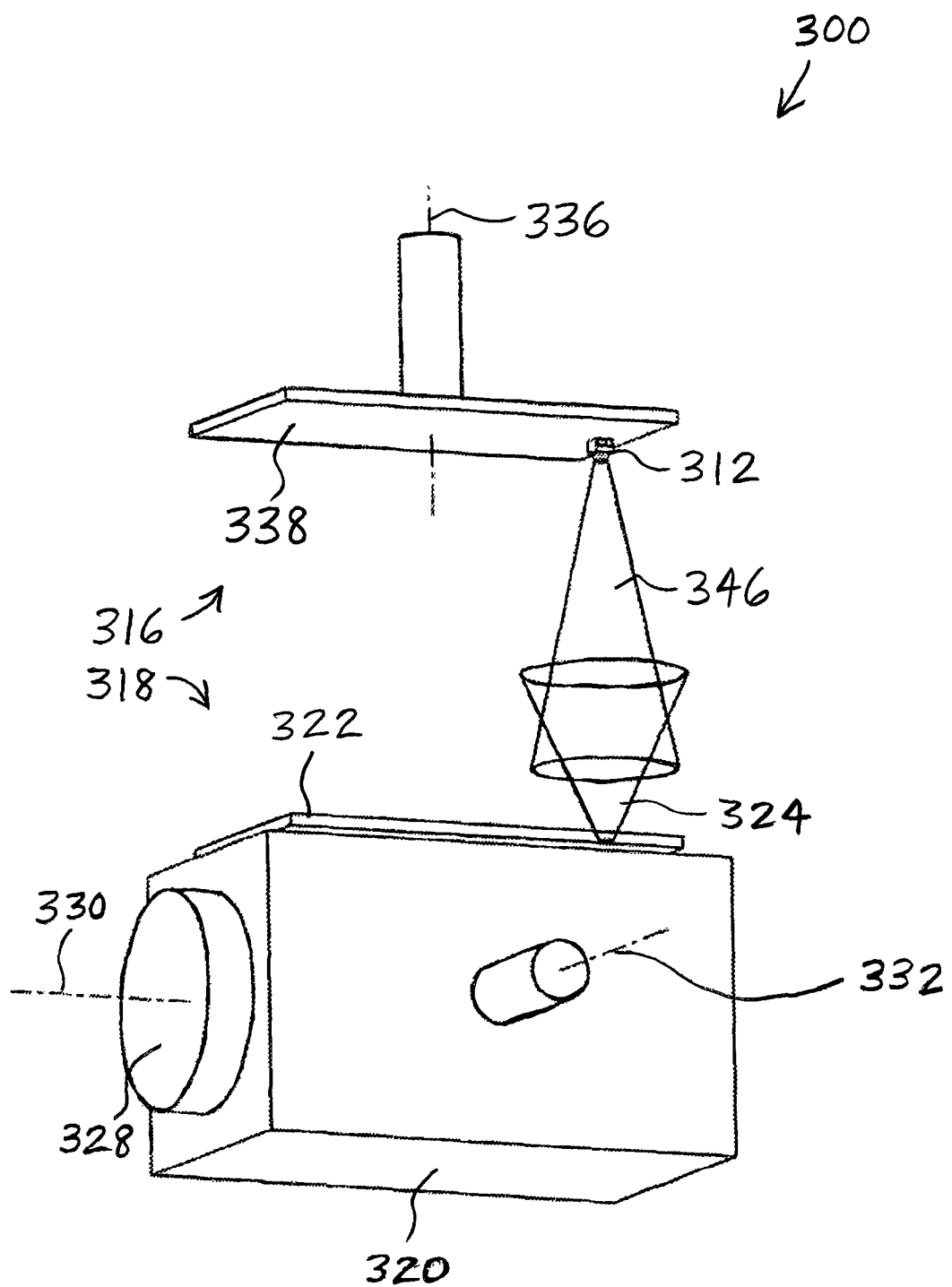
FIG. 6 is a schematic view of the surveillance camera arrangement of FIG. 4 after it has undergone further pan and tilt movements to achieve a final precise alignment of the emitter and the detector.

After the camera lens module's position has been tuned to the center of the beam's path as described above, and similarly to that shown in FIG. 6, the CPU may reset its pan and tilt counters to the numbers that represent the camera lens module's pan tilt home position. As described above, the combination of the home pan position and the home tilt position may be ascertained with only a single IR emitter/detector pair.

In some embodiments, the detector output signal is not necessarily at a maximum when the detector is at the center of the beam, but rather has a substantially equal value wherever the detector is disposed within the beam and drops off sharply at the boundary of the beam. In these embodiments, the CPU may use geometry and the detected boundary of the beam to locate the geometric center of the beam. That is, when scanning in the tilt direction, the CPU may identify a first beam boundary location when the detector enters the beam and a second beam boundary location when the detector exits the beam. The CPU may then identify the tilt position half way between the first beam boundary location and the second beam boundary location as corresponding to the center of the beam, and may deem this the home tilt position of the camera lens module. However, depending upon the diameter of the emitter beam, or the "spread" of the emitter beam, there may not be enough tilt range for the CPU to find the center of the beam. That is, if the tilt range of the camera lens module is not great enough to allow the detector to travel across the entire beam, then the CPU may be unable to locate the center of the beam. In this case, a barrier with an aperture can be placed between the emitter beam and the detector sensor to thereby limit the width of the beam appropriately as shown in FIG. 1, thus optimizing the operation. More particularly, the surveillance camera arrangement may include an optical barrier with an aperture such as fixed opaque barrier 40 (FIG. 1) with aperture 42, for example.

In another embodiment of a surveillance camera arrangement 800 (FIG. 8) of the present invention, a detector 814 is disposed on a fixed stage 816, and an emitter 812 is disposed on a moving stage 818. The detector output signal may be transmitted to CPU 850 via a slip ring, as indicated at 860. CPU 850 controls the orientation of camera lens module through operation of a tilt motor 852 and a pan motor 858. CPU 850 may also control the operation of emitter 812, as indicated at 862. However, it is alternatively possible for emitter 850 to emit optical energy 864 continuously without any external control. Other aspects of arrangement 800 may be substantially similar to those of arrangement 300, and thus are not described in detail herein in order to avoid needless repetition.

Figure 9:
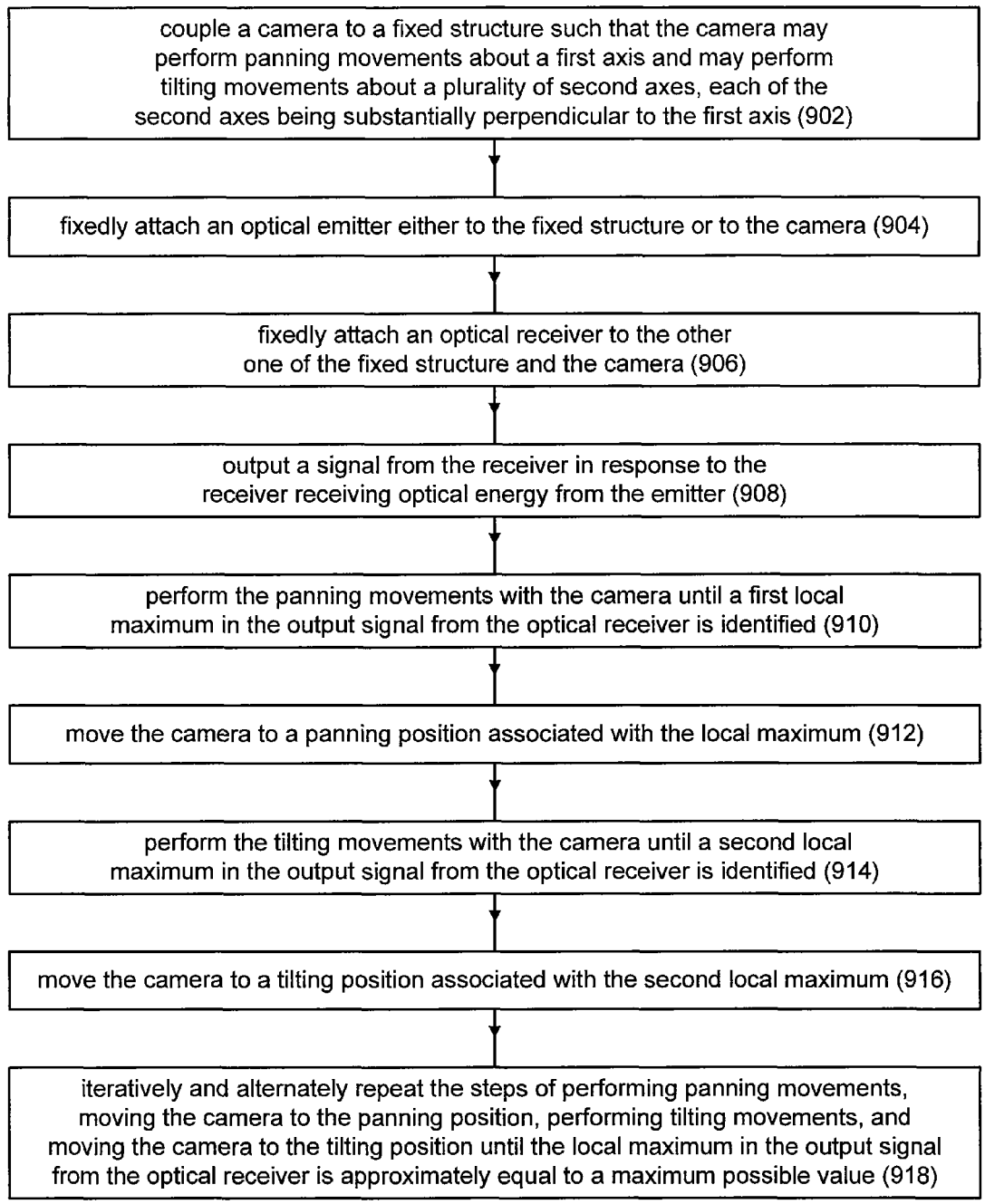
FIG. 9 is a flow chart of one embodiment of a method of the invention for placing a surveillance camera in a known reference orientation as a result of panning and tilting movements.

Illustrated in FIG. 9 is one embodiment of a method 900 of the invention for placing a surveillance camera in a known reference orientation as a result of panning and tilting movements. In a first step 902, the camera is coupled to a fixed structure such that the camera may perform the panning movements about a first axis and may perform the tilting movements about a plurality of second axes, each of the second axes being substantially perpendicular to the first axis. For example, in the embodiment of FIG. 3, a camera within camera lens module 320 may perform panning movements about axis 336 and may perform tilting movements about an axis 332 that is perpendicular to axis 336 and to optical axis 330. For each discrete panning position of camera lens module 320 about axis 336, camera lens module 320 tilts about a respective tilt axis that is perpendicular to both optical axis 330 and panning axis 336. Camera lens module 320 may be supported by any fixed structure through which module 320 is indirectly coupled to fixed stage 316. Further, camera lens module 320 may be directly coupled to fixed stage 316.

Figure 3:
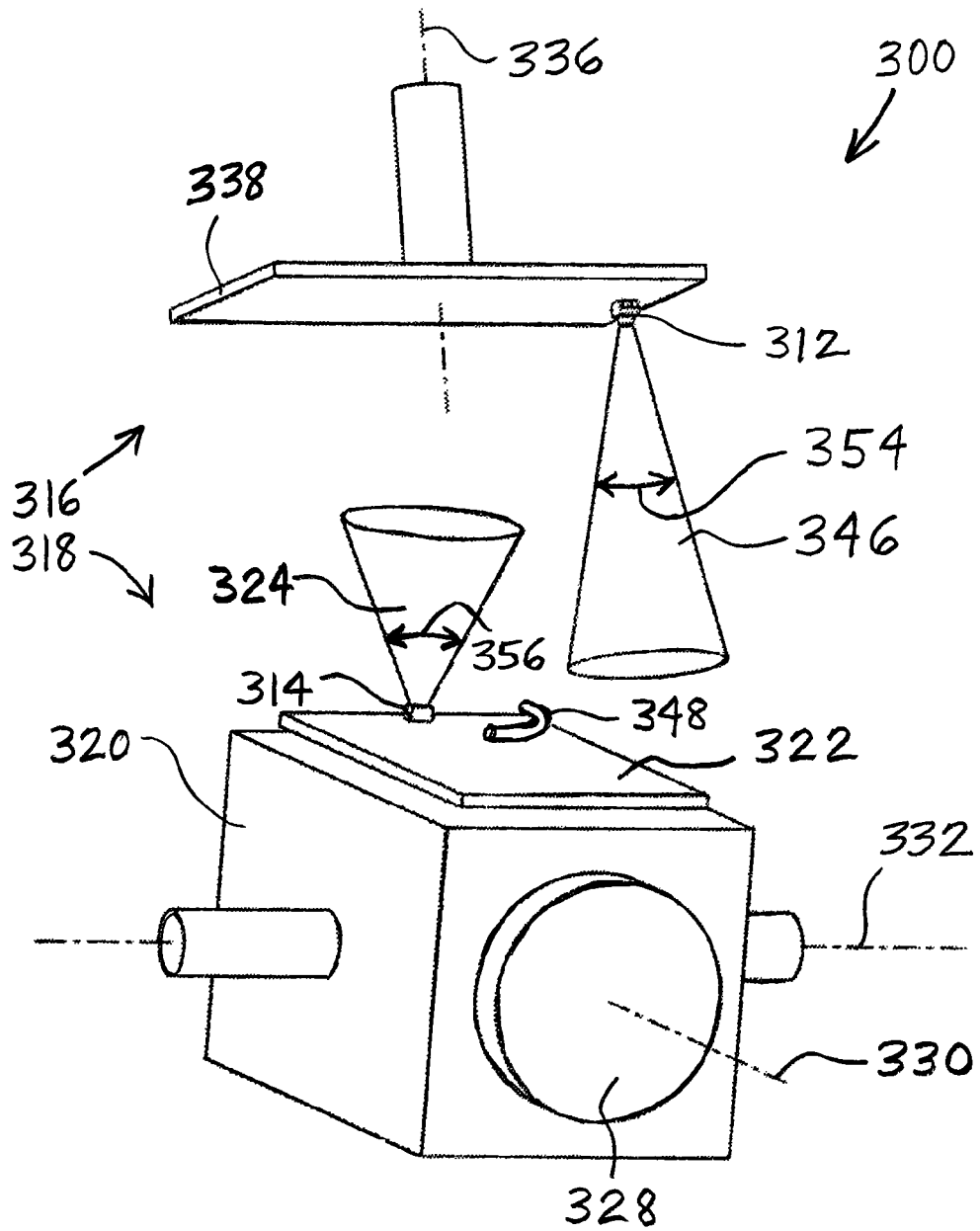
FIG. 3 is a schematic view of another embodiment of a surveillance camera arrangement of the present invention which has undergone tilt movement in order to achieve an initial position relative to a mechanical stop.
Figure 8:
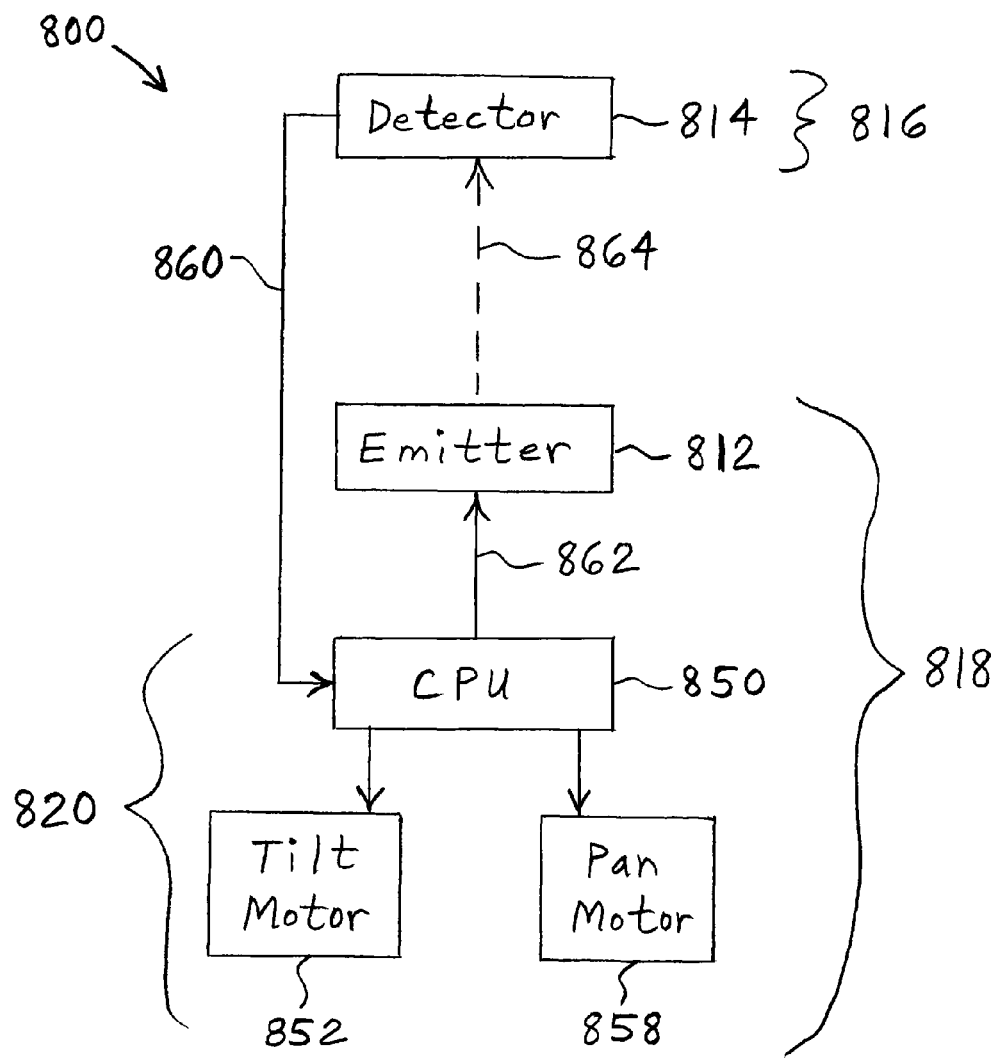
FIG. 8 is a simplified block diagram of the electronics of another embodiment of a surveillance camera arrangement of the present invention.

In a next step 904, an optical emitter is fixedly attached either to the fixed structure or to the camera. As shown in FIG. 3, optical emitter 312 may be fixedly attached to circuit board 338 of fixed stage 316. However, as shown in FIG. 8, an optical emitter 812 may be included in moving stage 818 and may be fixedly attached to camera lens module 820. Thus, optical emitter 812 may be at least indirectly fixedly attached to the camera within camera lens module 820.

Next, in step 906, an optical receiver is fixedly attached to the other one of the fixed structure and the camera. As shown in FIG. 3, optical receiver 314 may be included in moving stage 318 and may be fixedly attached to camera lens module 320. Thus, optical receiver 314 may be at least indirectly fixedly attached to the camera within camera lens module 320. However, as shown in FIG. 8, an optical receiver 814 may also be fixedly attached to fixed stage 816.

In step 908, a signal is output from the receiver in response to the receiver receiving optical energy from the emitter. Even in the position shown in FIG. 3, in which emission beam 346 does not intersect cone of reception 324, detector 314 may receive enough scattered optical energy from emitter 312 that detector 314 outputs a measureable output signal. Such a detector output signal is plotted in FIG. 5.

In a next step 910, the panning movements are performed with the camera until a first local maximum in the output signal from the optical receiver is identified. That is, CPU 350 may operate pan motor 358 such that moving stage 318 performs a full 360 degree rotation about panning axis 336. CPU 350 may then identify which panning position within the 360 degrees results in a maximum value for the detector output signal. Alternatively, CPU 350 may operate pan motor 358 such that moving stage 318 performs rotation about panning axis 336, but the panning is ceased when a local maximum value of the detector output signal can be identified. For example, as shown in the plot of FIG. 5, a maximum in the detector output signal can be clearly identified at a panning position of 173 degrees after moving stage 318 reaches a panning position of approximately between 200 and 240 degrees. In the specific example of FIG. 5, moving stage 318 reaches a panning position of 240 degrees before identifying a maximum value at 173 degrees. CPU 350 may conclude that this panning position at 173 degrees is as close to an alignment between emitter 312 and detector 314 as can be achieved with the given tilt position.

Next, in step 912, the camera is moved to a panning position associated with the local maximum. That is, in the example of FIG. 5, CPU 350 may operate pan motor 358 to move the panning position of moving stage 318 from the 240 degree position at which its panning movement was halted back to the 173 degree position corresponding to the maximum value of the detector output signal.

In step 914, the tilting movements are performed with the camera until a second local maximum in the output signal from the optical receiver is identified. For example, with the moving stage at the near-optimal panning position of 173 degrees identified in step 912, CPU 350 may operate tilt motor 352 to move moving stage 318 through its full range of tilt positions. CPU 350 may then determine which of these tilt positions corresponds to the highest detector output signal given the panning position established in step 912. Alternatively, CPU 350 may operate tilt motor 352 to move moving stage 318 only so far through its full range of tilt positions as necessary in order to determine a tilt position that corresponds to a local maximum in the detector output signal.

Next, in step 916, the camera is moved to a tilting position associated with the second local maximum. That is, similarly to the example of FIG. 5, CPU 350 may operate tilt motor 352 to move the tilting position of moving stage 318 from the position at which its tilting movement was halted back to the identified tilting position corresponding to the maximum value of the detector output signal.

In a final step 918, the steps of performing panning movements, moving the camera to the panning position, performing tilting movements, and moving the camera to the tilting position are iteratively and alternately repeated until the local maximum in the output signal from the optical receiver is approximately equal to a maximum possible value. That is, CPU 350 may cause moving stage 318 to repeat steps 910, 912, 914 and 916, in that order, as many times as necessary in order to reach a combination of panning position and tilting position from which no further increases in the detector output signal can be achieved. For example, steps 910, 912, 914 and 916 may be repeated until there is no increase in the detector output signal from one cycle of these steps to the next subsequent cycle, or until the increase is below a threshold value.

In the embodiments described above, a rough tilt position may be located before a rough pan home location is found. For example, panning movements are performed while keeping a constant tilt position in order to find a maximum in the detector output signal. Subsequently, tilting movements are performed while keeping constant the panning position associated with the maximum in the detector output signal in order to find another maximum in the detector output signal. However, it is to be understood that this order of performing panning movements and then tilting movements may be reversed within the scope of the invention such that a range of tilting movements may be performed before performing the panning movement.

Although the emitter beam and the reception cone are shown herein as having vertical orientations, it is also possible within the scope of the invention for the emitter beam and the cone of reception to have horizontal orientations, or orientations angled somewhere between vertical and horizontal orientations.

Figure 10:
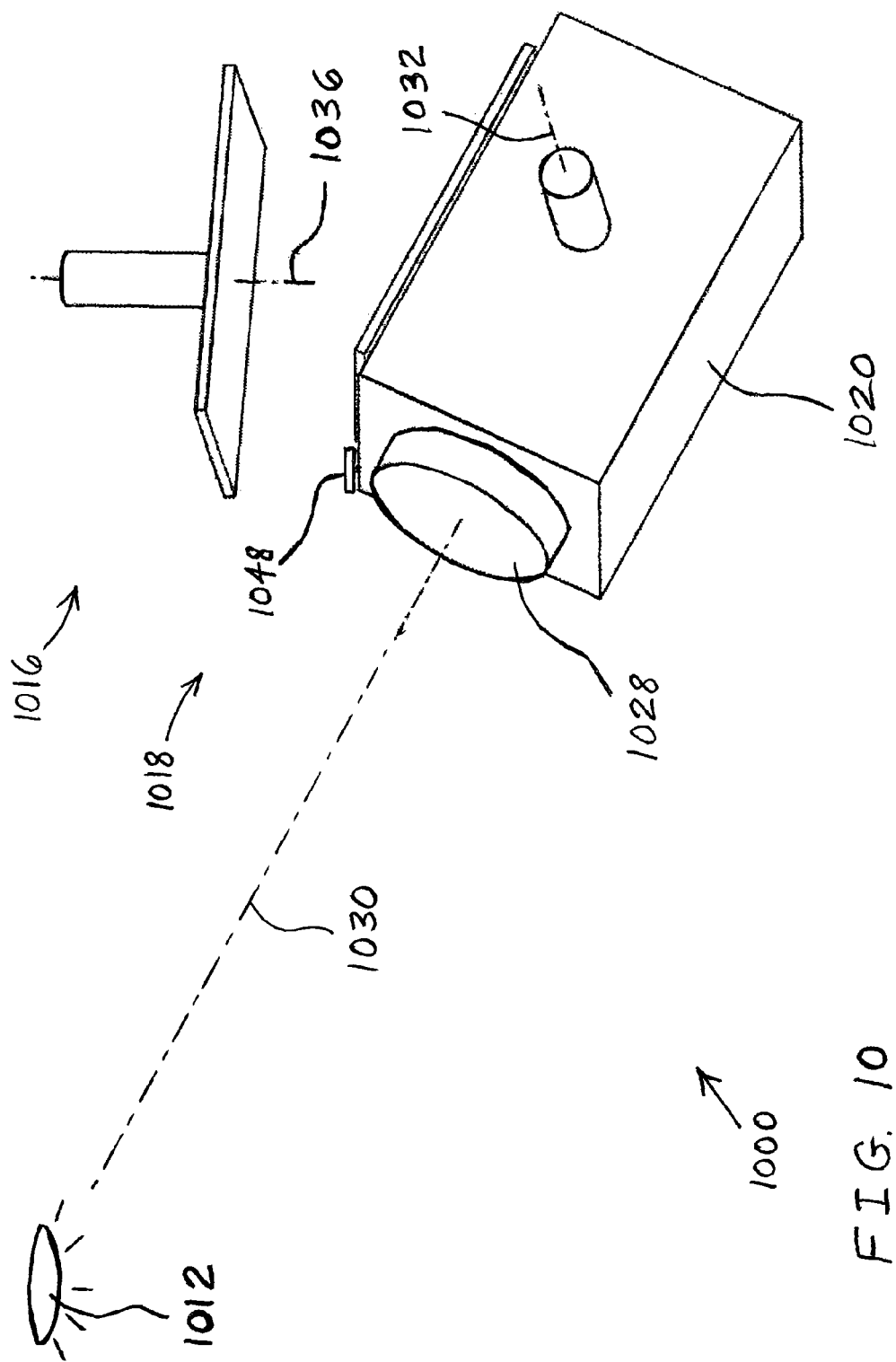
FIG. 10 is a schematic view of yet another embodiment of a surveillance camera arrangement of the present invention after it has undergone pan and tilt movements to maximize an amount of light received by the camera.

In yet another embodiment, illustrated in FIG. 10, a surveillance camera arrangement 1000 uses existing room lighting as the emitter of optical energy, and uses the camera as the detector of the optical energy. More particularly, arrangement 1000 includes a mechanical stop 1048 in the form of a fragmentarily-depicted annular ring that is disposed above camera lens module 1020 and that may rotate in panning movements along with camera lens module 1020.

Surveillance camera arrangement 1000 further includes a conventional fluorescent or incandescent ceiling light 1012 fixedly installed in a same ceiling to which a fixed stage 1016 is attached. Ceiling light 1012 may output light in all hemispherical directions below the ceiling, as is conventional for ceiling lighting.

Fixed stage 1016 may define a pan axis 1036 about which camera lens module 1020 may rotate. A moving stage 1018 includes, in addition to camera lens module 1020, an objective lens 1028 having an optical axis 1030. Moving stage 1018 undergoes tilting movement about a tilt axis 1032.

As described above, the moving stage may undergo tilt movement in order to set an initial tilt position relative to a mechanical stop. Initially at power up, a CPU (not shown) of camera lens module 1020 does not know the existing pan or tilt positions of the camera lens module. However, the CPU knows the mechanical limits of the tilt range (e.g., in degrees) relative to the horizon (e.g., a horizontal orientation of the camera lens module), and thus may use this knowledge to drive a tilt motor (not shown) to tilt camera lens module 1020 close to the horizontal orientation. That is, the CPU controls the tilt motor's actuation and tilts the camera lens module beyond the maximum operational tilt range to ensure that the camera lens module reaches and engages the upper mechanical stop 1048, which is a few degrees beyond the operational tilt range of the camera lens module as defined by software within the CPU. Mechanical stop 1048 may also be a few degrees beyond the tilt position of camera lens module 1020 when pointed directly at light 1012, as shown in FIG. 10.

The CPU may know the fixed angle between the orientation of camera lens module 1020 when it engages upper mechanical stop 1048 and the orientation of camera lens module 1020 when optical axis 1030 has a horizontal orientation. In one embodiment, this angle may be approximately between 30 degrees and 60 degrees. Once the CPU is sure that it has operated the tilt motor sufficiently to engage the mechanical stop with the camera lens module, the CPU may then operate the tilt motor in the opposite direction in order to tilt the camera lens module back down from the mechanical stop by the known angle (e.g., between 30 degrees and 60 degrees) between the mechanical stop and the horizon. Thus, the camera lens module is tilted back from engagement with the mechanical stop to a horizontal orientation, similar to the orientation shown in FIG. 1.

The CPU may then cause camera lens module 1020 to undergo panning and tilting movements as described above with reference to other embodiments until the level of light received by the camera has been maximized. Light 1012 may have a sufficient level of brightness that the camera receives the maximum level of light by being directed at light 1012, as shown in FIG. 10, or when the field of view of the camera is centered on light 1012. For example, light 1012 may be the brightest light in the room and in the field of view, and/or light 1012 may be the light that is closest to the camera. Other features of arrangement 1000 and its operation may be substantially similar to those of the other embodiments above, and thus are not described herein in order to avoid needless repetition.

Figure 11:
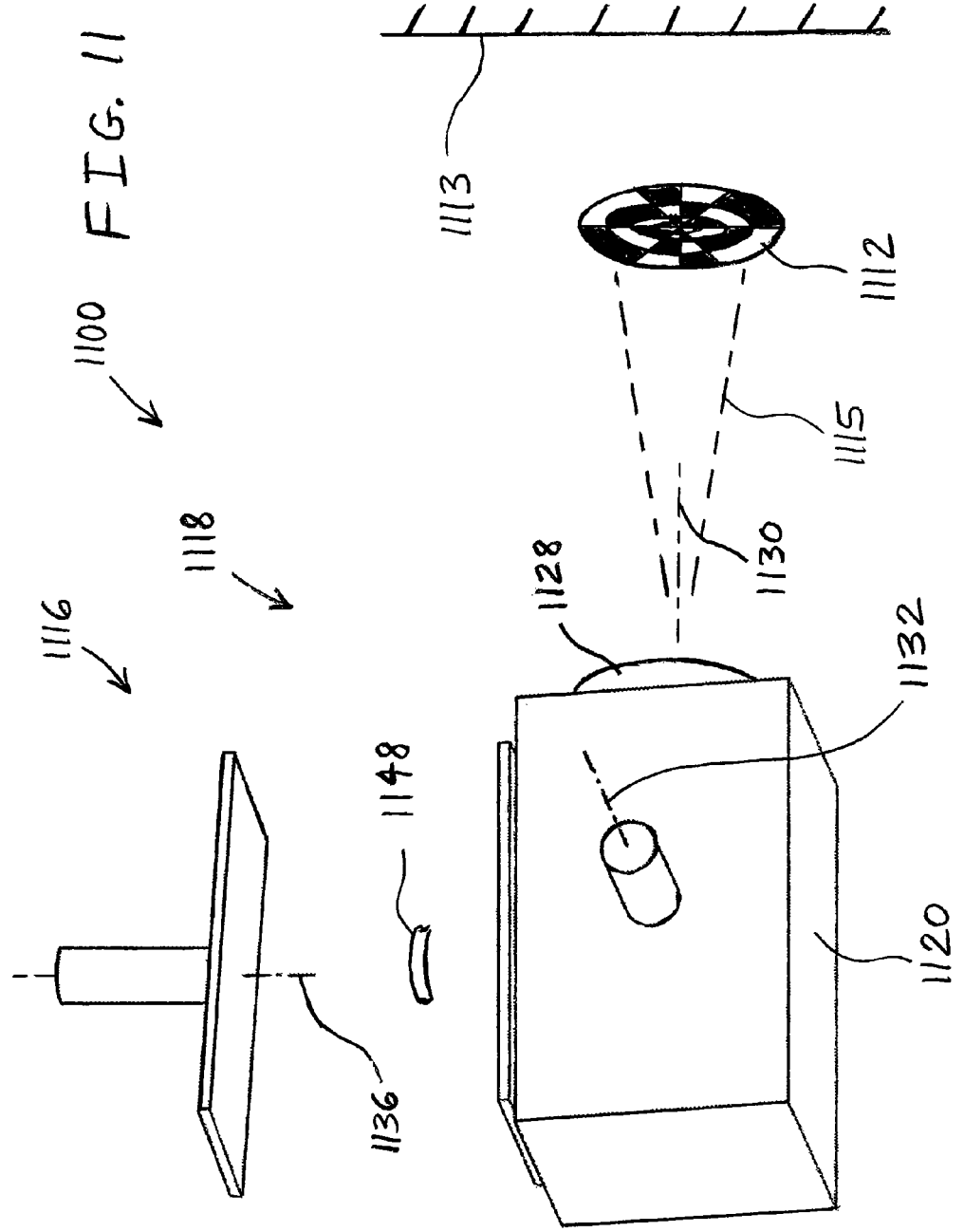
FIG. 11 is a schematic view of a further embodiment of a surveillance camera arrangement of the present invention after it has undergone pan and tilt movements to capture a recognizable optical pattern on a nearby wall.

In still another embodiment, illustrated in FIG. 11, a surveillance camera arrangement 1100 uses the camera to recognize a predetermined pattern posted at a fixed location on a wall that is near the camera. More particularly, arrangement 1100 includes a mechanical stop 1148 in the form of a fragmentarily-depicted annular ring that is disposed above camera lens module 1120 and that may rotate in panning movements along with camera lens module 1120.

Surveillance camera arrangement 1100 further includes a pattern 1112 that is permanently installed on a nearby wall 1113 and that is easily recognizable by pattern recognition software accessible by the CPU within camera lens module 1120. Pattern 1112 and a field of view 1115 of the camera may be such that the CPU can easily determine when pattern 1112 is centered within field of view 1115. In the embodiment shown in FIG. 11, pattern 1112 is a circular checkerboard type of pattern, similar to a test pattern.

Fixed stage 1116 may define a pan axis 1136 about which camera lens module 1120 may rotate. A moving stage 1118 includes, in addition to camera lens module 1120, an objective lens 1128 having an optical axis 1130. Moving stage 1118 undergoes tilting movement about a tilt axis 1132.

As described above, the moving stage may undergo tilt movement in order to set an initial tilt position relative to a mechanical stop. Initially at power up, a CPU (not shown) of camera lens module 1120 does not know the existing pan or tilt positions of the camera lens module. However, the CPU knows the mechanical limits of the tilt range (e.g., in degrees) relative to the horizon (e.g., a horizontal orientation of the camera lens module), and thus may use this knowledge to drive a tilt motor (not shown) to tilt camera lens module 1120 close to the horizontal orientation, where pattern 1112 may be centered. That is, the CPU controls the tilt motor's actuation and tilts the camera lens module beyond the maximum operational tilt range to ensure that the camera lens module reaches and engages the upper mechanical stop 1148, which is a few degrees beyond the operational tilt range of the camera lens module as defined by software within the CPU.

The CPU may know the fixed angle between the orientation of camera lens module 1120 when it engages upper mechanical stop 1148 and the orientation of camera lens module 1120 when optical axis 1130 has a horizontal orientation. In one embodiment, this angle may be approximately between 30 degrees and 60 degrees. Once the CPU is sure that it has operated the tilt motor sufficiently to engage the mechanical stop with the camera lens module, the CPU may then operate the tilt motor in the opposite direction in order to tilt the camera lens module back down from the mechanical stop by the known angle (e.g., between 10 degrees and 15 degrees) between the mechanical stop and the horizon. Thus, the camera lens module is tilted back from engagement with the mechanical stop to a horizontal orientation, similar to the orientation shown in FIG. 1. Because pattern 1112 is posted in a vertical orientation, the camera may have the best view of pattern 1112 when the center of pattern 1112 is disposed along a horizontal axis 1130, as shown.

The CPU may then cause camera lens module 1120 to undergo panning and tilting movements as described above with reference to other embodiments (with perhaps only fine tuning of the tilt position being called for, however) until the CPU determines that pattern 1112 has been centered within the camera's field of view. Pattern 1112 may be sized to approximately match the size of the camera's field of view at the given distance and at a given focal length of the camera. Other features of arrangement 1100 and its operation may be substantially similar to those of the other embodiments above, and thus are not described herein in order to avoid needless repetition.

Figure 12:
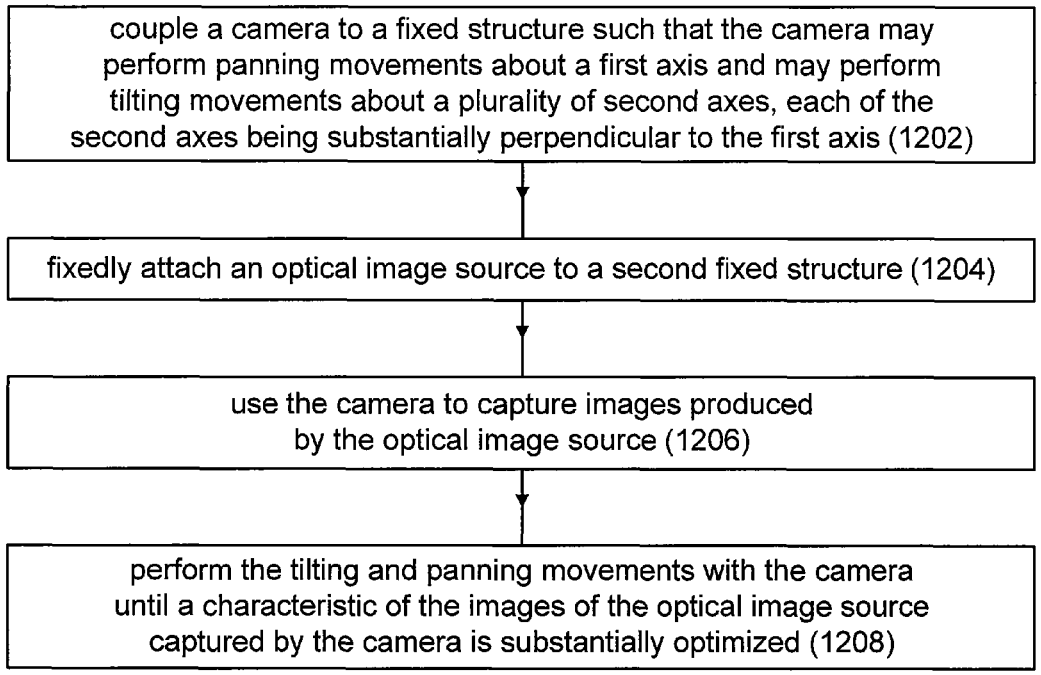
FIG. 12 is a flow chart of another embodiment of a method of the invention for placing a surveillance camera in a known reference orientation as a result of panning and tilting movements.

Yet another embodiment of a method 1200 for placing a surveillance camera in a known reference orientation as a result of panning and tilting movements is illustrated in FIG. 12. In a first step 1202, the camera is coupled to a first fixed structure such that the camera may perform the panning movements about a first axis and may perform the tilting movements about a plurality of second axes. Each of the second axes is substantially perpendicular to the first axis. For example, in the embodiment of FIG. 10, a camera within camera lens module 1020 may perform panning movements about axis 1036 and may perform tilting movements about an axis 1032 that is perpendicular to axis 1036 and to optical axis 1030. For each discrete panning position of camera lens module 1020 about axis 1036, camera lens module 1020 tilts about a respective tilt axis that is perpendicular to both optical axis 1030 and panning axis 1036. Camera lens module 1020 may be supported by any fixed structure through which module 1020 is indirectly coupled to fixed stage 1016. Further, camera lens module 1020 may be directly coupled to fixed stage 1016.

In a next step 1204, an optical image source is fixedly attached to a second fixed structure. For example, in the embodiment of FIG. 10, an optical image source in the form of a light 1012 is fixedly attached to a second fixed structure in the form of a ceiling. As another example, in the embodiment of FIG. 11, an optical image source in the form of a pattern 1112 is fixedly attached to a second fixed structure in the form of a wall.

Next, in step 1206, the camera is used to capture images produced by the optical image source. That is, the camera of camera lens module 1020 may be used to capture images of light 1012. Moreover, the camera of camera lens module 1120 may be used to capture images of pattern 1112.

In a final step 1208, the tilting and panning movements are performed with the camera until a characteristic of the images of the optical image source captured by the camera is substantially optimized. In the example of FIG. 10, tilting and panning movements are performed with the camera until a level of light captured by the camera from light 1012 is maximized. In the example of FIG. 11, tilting and panning movements are performed with the camera until pattern 1112 is centered within the camera's field of view.

While this invention has been described as having an exemplary design, the present invention may be further modified within the spirit and scope of this disclosure. This application is therefore intended to cover any variations, uses, or adaptations of the invention using its general principles.

What is claimed is:

1. A method of placing a surveillance camera in a known reference orientation as a result of panning and tilting movements, the method including the steps of:
coupling the camera to a fixed structure such that the camera may perform the panning movements about a first axis and may perform the tilting movements about a plurality of second axes, each of the second axes being substantially perpendicular to the first axis;
fixedly attaching an optical emitter either to the fixed structure or to the camera;

fixedly attaching an optical receiver to an other one of the fixed structure and the camera; and performing the tilting and panning movements with the camera until the emitter and receiver are in a predetermined position relative to each other as determined from a signal that is output by the receiver in response to receiving optical energy from the emitter, the performing step including:

performing the tilting movements with the camera until a first local maximum in the output signal from the optical receiver is identified;

moving the camera to a tilting position associated with the local maximum;

performing the panning movements with the camera until a second local maximum in the output signal from the optical receiver is identified;

moving the camera to a panning position associated with the second local maximum; and iteratively and alternately repeating the steps of performing tilting movements, moving the camera to the tilting position, performing panning movements, and moving the camera to the panning position until the local maximum in the output signal from the optical receiver is approximately equal to a maximum possible value.

2. A surveillance camera arrangement, comprising:

a camera coupled to a fixed structure;

means for actuating the camera to perform panning movements about a vertical axis and perform tilting movements about any of a plurality of horizontal axes;

an optical emitter fixedly attached to either the fixed structure or the camera;

an optical receiver fixedly attached to an other one of the fixed structure and the camera and configured to produce an output signal in response to receiving optical energy from the optical emitter; and a processor configured to:

receive the output signal from the optical receiver; and drive the actuating means, dependent upon the output signal from the optical receiver, to cause the camera to:

perform the tilting movements until a first local maximum in the output signal from the optical receiver is identified;

move to a tilting position associated with the first local maximum;

perform the panning movements until a second local maximum in the output signal from the optical receiver is identified;

move to a panning position associated with the second local maximum; and iteratively and alternately repeating the steps of performing tilting movements, moving to the tilting position, performing panning movements, and moving to the panning position until the local maximum in the output signal from the optical receiver is approximately equal to a maximum possible value.

3. A method of placing a surveillance camera in a known reference orientation as a result of panning and tilting movements, the method including the steps of:

coupling the camera to a fixed structure such that the camera may perform the panning movements about a first axis and may perform the tilting movements about a plurality of second axes, each of the second axes being substantially perpendicular to the first axis;

fixedly attaching an optical emitter either to the fixed structure or to the camera;

fixedly attaching an optical receiver to an other one of the fixed structure and the camera;

outputting a signal from the receiver in response to the receiver receiving optical energy from the emitter;

performing the panning movements with the camera until a first local maximum in the output signal from the optical receiver is identified;

moving the camera to a panning position associated with the local maximum;

performing the tilting movements with the camera until a second local maximum in the output signal from the optical receiver is identified;

moving the camera to a tilting position associated with the second local maximum; and iteratively and alternately repeating the steps of performing panning movements, moving the camera to the panning position, performing tilting movements, and moving the camera to the tilting position until the local maximum in the output signal from the optical receiver is approximately equal to a maximum possible value.

4. The method of claim 3 wherein the local maximum in the output signal from the optical receiver being approximately equal to the maximum possible value is indicative of the emitter and receiver being in a predetermined position relative to each other as determined from the optical signal received by the receiver.

5. The method of claim 3 wherein a determination that the local maximum in the output signal from the optical receiver is approximately equal to a maximum possible value is made as a result of the output signal from the optical receiver no longer increasing with each iteration.

6. The method of claim 3 wherein when the local maximum in the output signal from the optical receiver is approximately equal to a maximum possible value, the emitter and receiver are substantially aligned with each other.

7. A method of placing a surveillance camera in a known reference orientation as a result of panning and tilting movements, the method including the steps of:

coupling the camera to a first fixed structure such that the camera may perform the panning movements about a first axis and may perform the tilting movements about a plurality of second axes, each of the second axes being substantially perpendicular to the first axis;

fixedly attaching an optical image source to a second fixed structure;

using the camera to capture images produced by the optical image source; and performing the tilting and panning movements with the camera until a characteristic of the images of the optical image source captured by the camera is substantially optimized.

8. The method of claim 7 wherein a field of view of the camera is substantially centered on the optimal image source when the characteristic of the images of the optical image source captured by the camera is substantially optimized.

* * * * *